(12) United States Patent
Fukagawa

(10) Patent No.: US 10,494,540 B2
(45) Date of Patent: Dec. 3, 2019

(54) CURABLE COMPOSITION, COATING, AND LAMINATE

(71) Applicant: FUJIFILM Corporation, Tokyo (JP)

(72) Inventor: Kiyotaka Fukagawa, Kanagawa (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 178 days.

(21) Appl. No.: 15/873,964

(22) Filed: Jan. 18, 2018

(65) Prior Publication Data

US 2018/0142119 A1    May 24, 2018

Related U.S. Application Data

(63) Continuation of application No. PCT/JP2016/070043, filed on Jul. 6, 2016.

(30) Foreign Application Priority Data

Jul. 29, 2015    (JP) .................... 2015-149245

(51) Int. Cl.
| | |
|---|---|
| *C08F 220/60* | (2006.01) |
| *C08F 230/02* | (2006.01) |
| *C08F 220/34* | (2006.01) |
| *C09D 4/00* | (2006.01) |
| *C09D 133/26* | (2006.01) |

(Continued)

(52) U.S. Cl.
CPC ............ *C09D 133/26* (2013.01); *B32B 27/34* (2013.01); *B32B 33/00* (2013.01); *B32B 37/06* (2013.01); *C08K 5/19* (2013.01); *C08L 33/26* (2013.01); *B32B 2307/536* (2013.01); *B32B 2307/70* (2013.01)

(58) Field of Classification Search
CPC ....... C09D 133/26; B32B 27/34; B32B 33/00; B32B 37/06; B32B 2307/536; B32B 2307/70; C08K 5/19; C08K 33/26
USPC ...................................................... 524/555
See application file for complete search history.

(56) References Cited

U.S. PATENT DOCUMENTS

| | | |
|---|---|---|
| 2013/0250002 A1 | 9/2013 | Nishimura et al. |
| 2015/0133566 A1 | 5/2015 | Gong et al. |

(Continued)

FOREIGN PATENT DOCUMENTS

| | | |
|---|---|---|
| JP | 2000-192020 A | 7/2000 |
| JP | 2012-177040 A | 9/2012 |

(Continued)

*Primary Examiner* — Kelechi C Egwim
(74) *Attorney, Agent, or Firm* — Sughrue Mion, PLLC

(57) ABSTRACT

An object of the present invention is to provide a curable composition, a coating, and a laminate which enable production of a coating that can exhibit excellent antifogging properties and is excellent in antifogging durability while maintaining a high hardness. The present invention relates to a curable composition including: at least one polyfunctional (meth)acrylamide compound selected from the group consisting of a compound represented by General Formula (I) and a compound represented by General Formula (II); and at least one betaine monomer selected from the group consisting of compounds represented by General Formula (IV) to (VI); and a coating and a laminate obtained by using the curable composition.

12 Claims, 1 Drawing Sheet

General Formula (I)

General Formula (II)

General Formula (III)

General Formula (IV)

General Formula (V)

General Formula (VI)

(51) Int. Cl.
 *B32B 27/34* (2006.01)
 *B32B 33/00* (2006.01)
 *B32B 37/06* (2006.01)
 *C08K 5/19* (2006.01)
 *C08L 33/26* (2006.01)

(56) References Cited

U.S. PATENT DOCUMENTS

2015/0159032 A1 6/2015 Yofu
2017/0362458 A1* 12/2017 Cheng .................. C07C 229/12

FOREIGN PATENT DOCUMENTS

| JP | 2013-194226 A | 9/2013 |
| JP | 2013-237737 A | 11/2013 |
| WO | 2014/050551 A1 | 4/2014 |
| WO | 2016/067795 A1 | 5/2016 |

* cited by examiner

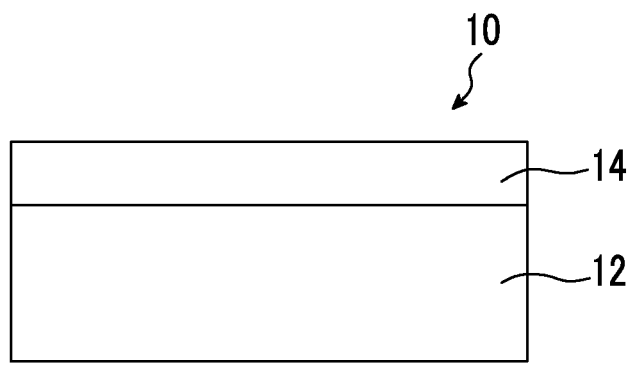

CURABLE COMPOSITION, COATING, AND LAMINATE

CROSS-REFERENCE TO RELATED APPLICATIONS

This application is a Continuation of PCT International Application No. PCT/JP2016/070043 filed on Jul. 6, 2016, which claims priority under 35 U.S.C. § 119(a) to Japanese Patent Application No. 2015-149245 filed on Jul. 29, 2015. The above application is hereby expressly incorporated by reference, in its entirety, into the present application.

BACKGROUND OF THE INVENTION

1. Field of the Invention

The present invention relates to a curable composition, a coating, and a laminate.

2. Description of the Related Art

In recent years, with the progress of an inkjet recording technology, an inkjet recording method has been used for photos or offset-printed high-definition images, and thus high-quality printing has been required.

In response to the above-described requirement, for the purpose of providing an ink composition with excellent jetting stability, an ink composition which includes water; a cross-linked polymer-coated pigment having a surface where at least a part is coated with a cross-linked polymer; a polymer isolated from the pigment; and 30 ppm to 200 ppm of at least one divalent metal ion with respect to the total mass of the ink composition is disclosed (JP2013-194226A).

For the purpose of providing an antifogging agent composition which is capable of imparting antifogging properties and antifouling properties to a surface of a material, JP2000-192020A discloses an antifogging agent composition including, as an A component, 0.01% to 30% by weight of a polymer that contains 30% by weight or greater of (meth)acrylate represented by General Formula [I] as a constituent component; and, as a B component, 69% to 99.9% by weight of a solvent which dissolves the polymer.

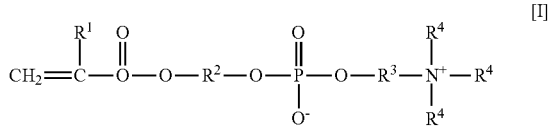

{In the formula, $R^1$ represents a hydrogen atom or a methyl group, $R^2$ represents a —$(CH_2CHR^5)_m$— group or a —$(CH_2CHR^5O)_mCH_2CHR^5$— group (here, $R^5$ represents a hydrogen atom or a methyl group, and m represents an integer of 1 to 8). Further, $R^3$ represents a —$(CH_2)_n$— group (n represents an integer of 2 to 4). Further, $R^4$'s may be the same as or different from each other and represent an alkyl group having 1 to 8 carbon atoms.

SUMMARY OF THE INVENTION

Under the above-described circumstances, a composition that contains a polyfunctional (meth)acrylamide compound and (meth)acrylate containing a hydroxy group is prepared and evaluated by the present inventors with reference to JP2013-194226A. As the result, it was found that fogging occurs and antifogging properties cannot be maintained in some cases in a coating obtained from this composition (corresponding to Comparative Example 2 in the present specification).

Further, a composition that contains polyfunctional acrylate and a monomer having a betaine structure is prepared and evaluated by the present inventors with reference to JP2000-192020A. As the result, it was found that fogging occurs, antifogging properties cannot be maintained, and the hardness is low in some cases in a coating obtained from this composition (corresponding to Comparative Example 3 in the present specification).

The present invention has been made in consideration of the above-described circumstances, and an object thereof is to provide a curable composition which enables production of a coating that can exhibit excellent antifogging properties and is excellent in antifogging durability while maintaining a high hardness.

Further, another object of the present invention is to provide a coating and a laminate.

As the result of intensive research conducted by the present inventors in order to solve the above-described problems, it was found that predetermined effects can be obtained according to a composition which contains a polyfunctional (meth)acrylamide compound having a specific structure; and a betaine monomer having a specific structure, thereby completing the present invention.

The present invention has been made based on the above-described findings and, specifically, the above-described problems can be solved using the following configurations.

[1] A curable composition comprising: at least one polyfunctional (meth)acrylamide compound selected from the group consisting of a compound represented by General Formula (I) described below and a compound represented by General Formula (II) described below; and at least one betaine monomer selected from the group consisting of compounds represented by General Formula (IV) to (VI) described below.

[2] The curable composition according to [1], in which the mass ratio between the polyfunctional (meth)acrylamide compound and the betaine monomer is in a range of 10:90 to 90:10.

[3] The curable composition according to [1] or [2], in which the content of the polyfunctional (meth)acrylamide compound is 10% by mass or greater and less than 90% by mass with respect to the solid content of the composition.

[4] A coating which is obtained by curing the curable composition according to any one of [1] to [3] using light or heat.

[5] A laminate comprising: a base material; and the coating according to [4] which is disposed on the base material.

According to the curable composition of the present invention, it is possible to produce a coating that can exhibit excellent antifogging properties and is excellent in antifogging durability while maintaining a high hardness.

The coating of the present invention and the laminate of the present invention can exhibit excellent antifogging properties and are excellent in antifogging durability while maintaining a high hardness.

BRIEF DESCRIPTION OF THE DRAWINGS

FIG. 1 is a cross-sectional view schematically illustrating an example of a laminate of the present invention.

DESCRIPTION OF THE PREFERRED EMBODIMENTS

Hereinafter, the present invention will be described in detail.

In the present specification, the concept of "(meth)acrylamide" includes any or both of acrylamide and methacrylamide, and the same applies to the terms "(meth)acryl" and "(meth)acrylate". Further, the numerical ranges shown using "to" indicate ranges including the numerical values described before and after "to" as the lower limits and the upper limits.

In the present specification, in a case where a plurality of substituents, linking groups, or the like (hereinafter, referred to as substituents or the like) represented by specific symbols are present or a plurality of substituents or the like are defined at the same time, the respective substituents or the like may be the same as or different from each other. The same applies to the definition of the number of substituents or the like.

Further, in a case where groups (atomic groups) are noted without mentioning substitution and unsubstitution in the present specification, the concept thereof includes groups which do not have substituents and groups which have substituents. For example, the concept of an "alkyl group" includes not only an alkyl group (unsubstituted alkyl group) which does not have a substituent but also an alkyl group (substituted alkyl group) which has a substituent.

In the present specification, in a case where a component contains two or more substances, the content of the component indicates the total content of two or more substances.

In the present specification, it may be described that effects of the present invention are further excellent in a case where at least one of exhibition of antifogging properties, maintenance of the hardness, and antifogging durability is further excellent.

[Curable Composition]

A curable composition of the present invention (hereinafter, also referred to as a "composition of the present invention") includes at least one polyfunctional (meth)acrylamide compound selected from the group consisting of a compound represented by General Formula (I) and a compound represented by General Formula (II); and at least one betaine monomer selected from the group consisting of compounds represented by General Formula (IV) to (VI).

Since the composition of the present invention has such a configuration, desired effects are considered to be obtained. The reason thereof is not clear, but can be speculated as follows.

As described above, in a case where the composition contains a polyfunctional (meth)acrylamide compound and acrylate containing a hydroxy group, antifogging properties are not exhibited and antifogging durability is degraded. It was found that this phenomenon is caused by low hydrophilicity of a coating obtained from such a composition (Comparative Example 2).

In a case where a composition contains a betaine monomer and polyfunctional (meth)acrylate, a coating to be obtained does not exhibit antifogging and the antifogging durability and the hardness thereof are degraded. Based on the examination of the present invention, it was found that this phenomenon is caused by cloudiness of the composition to be obtained and low compatibility between the betaine monomer and the polyfunctional (meth)acrylate (Comparative Example 3).

Further, in a case where a composition contains a monomer having salts (a cation and an anion are adjacent to each other), antifogging properties are not exhibited and antifogging durability is degraded. It was found that this phenomenon is caused by low hydrophilicity of a coating to be obtained from such a composition (Comparative Example 4).

The present invention has been made based on the above-described findings, and a specific (meth)acrylamide compound and a specific monomer described below are used in combination. In other words, the above-described combination is considered to have high compatibility, antifogging properties which are exhibited due to high hydrophilicity of a coating to be obtained, and excellent antifogging durability while increasing the hardness of a coating to be obtained.

Hereinafter, each component to be contained in the composition of the present invention will be described in detail.

[Polyfunctional (Meth)Acrylamide Compound]

The composition of the present invention contains at least one polyfunctional (meth)acrylamide compound selected from the group consisting of a compound represented by General Formula (I) and a compound represented by General Formula (II).

In the present invention, since the polyfunctional (meth)acrylamide compound has a plurality of ethylenically unsaturated bonds, the polyfunctional (meth)acrylamide compound can function as a cross-linking agent. Accordingly, the hardness of a coating to be obtained can be increased and the antifogging durability can be improved.

Further, since the polyfunctional (meth)acrylamide compound has an amide bond, the coating to be obtained has excellent hydrophilicity and can exhibit antifogging properties.

<Compound Represented by General Formula (I)>

General Formula (I)

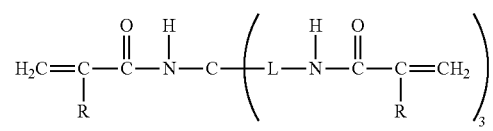

In General Formula (I), R represents a hydrogen atom or a methyl group. A plurality of R's may be the same as or different from each other.

L represents —O—, an alkylene group having 2 to 4 carbon atoms, or a divalent linking group formed by combining these. Further, it is preferable that carbon atoms are positioned at a position adjacent to a nitrogen atom in an amide group which is adjacent to L. That is, it is preferable that an alkylene group having 2 to 4 carbon atoms is positioned as the group adjacent to a nitrogen atom in an amide group.

Examples of the "divalent linking group formed by combining these" include an alkylene group having —O— and 2 to 4 carbon atoms such as —OCH$_2$CH$_2$—, —OCH$_2$CH$_2$CH$_2$—, —OCH$_2$CH$_2$CH$_2$CH$_2$—, —CH$_2$OCH$_2$—, —CH$_2$OCH$_2$CH$_2$—, or —CH$_2$OCH$_2$CH$_2$CH$_2$—; and a group represented by —(O-alkylene group (having 2 to 4 carbon atoms))$_n$- (n represents an integer of 2 or greater, the upper limit is not particularly limited and approximately 100 is exemplified as the upper limit). Further, in each group exemplified as the "divalent linking group formed by combining these", one of two bonding sites may be bonded to the amide group.

Among these, from the viewpoint of excellent effects of the present invention, it is preferable that L represents an alkylene group having —O— and 2 to 4 carbon atoms.

<Compound Represented by General Formula (II)>

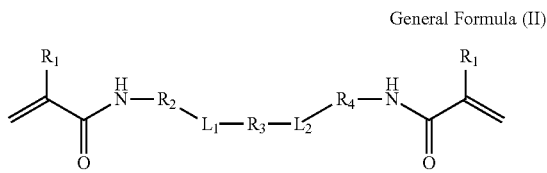

General Formula (II)

In General Formula (II), $R_1$'s each independently represent a hydrogen atom or a methyl group.

$R_2$ and $R_4$ each independently represent —O—, an alkylene group having 1 to 4 carbon atoms, or a divalent linking group formed by combining these. Further, it is preferable that carbon atoms are positioned at a position adjacent to a nitrogen atom in an amide group which is adjacent to $R_2$ and $R_4$. It is preferable that an alkylene group having 1 to 4 carbon atoms is positioned as the group adjacent to a nitrogen atom in an amide group.

Examples of the "divalent linking group formed by combining these" include an alkylene group having —O— and 1 to 4 carbon atoms such as —OCH$_2$—, —OCH$_2$CH$_2$—, —OCH$_2$CH$_2$CH$_2$—, —OCH$_2$CH$_2$CH$_2$CH$_2$—, —CH$_2$OCH$_2$—, —CH$_2$OCH$_2$CH$_2$—, or —CH$_2$OCH$_2$CH$_2$CH$_2$—; and a group represented by —(O-alkylene group (having 1 to 4 carbon atoms))$_n$- (n represents an integer of 2 or greater, the upper limit is not particularly limited and approximately 100 is exemplified as the upper limit). Further, in each group exemplified as the "divalent linking group formed by combining these", one of two bonding sites may be bonded to the amide group.

Among these, from the viewpoint of excellent effects of the present invention, it is more preferable that $R_2$ and $R_4$ represent an alkylene group having 1 to 4 carbon atoms or an alkylene group having —O— and 1 to 4 carbon atoms.

In General Formula (II), $R_3$ represents —O—, an alkylene group having 1 to 4 carbon atoms, a group represented by General Formula (III), or a divalent linking group formed by combining these.

Examples of the "divalent linking group formed by combining these" include groups exemplified as $R_2$ and $R_4$ above. Further, in a case where a group represented by General Formula (III) is combined with another group, it is preferable that an alkylene group having 1 to 4 carbon atoms is bonded to a nitrogen atom in the group represented by General Formula (III).

Among these, from the viewpoint of excellent effects of the present invention, it is preferable that $R_3$ represents an alkylene group having 1 to 4 carbon atoms, an alkylene group having —O— and 1 to 4 carbon atoms, or a group represented by General Formula (III).

$L_1$ and $L_2$ each independently represent a single bond or a group represented by General Formula (III).

In a case where $R_3$ represents a group represented by General Formula (III), it is preferable that both of $L_1$ and $L_2$ represent a single bond.

In General Formula (II), in a case where $R_3$ represents a group represented by General Formula (III), $R_2$ and $R_4$ can be set to each independently represent an alkylene group having 1 to 4 carbon atoms and $L_1$ and $L_2$ can be set to represent a single bond.

In a case where $R_3$ represents an alkylene group having 1 to 4 carbon atoms, $L_1$ and $L_2$ can be set to represent a group represented by General Formula (III) and $R_2$ and $R_4$ can be set to each independently represent an alkylene group having 1 to 4 carbon atoms.

In a case where $R_3$ represents an alkylene group having —O— and 1 to 4 carbon atoms (for example, —CH$_2$OCH$_2$—), $L_1$ and $L_2$ can be set to represent a single bond and $R_2$ and $R_4$ can be set to each independently represent an alkylene group having —O— and 1 to 4 carbon atoms (for example, —CH$_2$OCH$_2$CH$_2$CH$_2$—).

(Group Represented by General Formula (III))

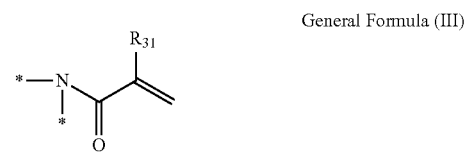

General Formula (III)

In General Formula (III), $R_{31}$ represents a hydrogen atom or a methyl group, and the symbol "*" represents a bonding site. Further, a carbon atom is typically positioned at the site of "*".

Specific examples of the compound represented by General Formula (I) or (II) will be described below.

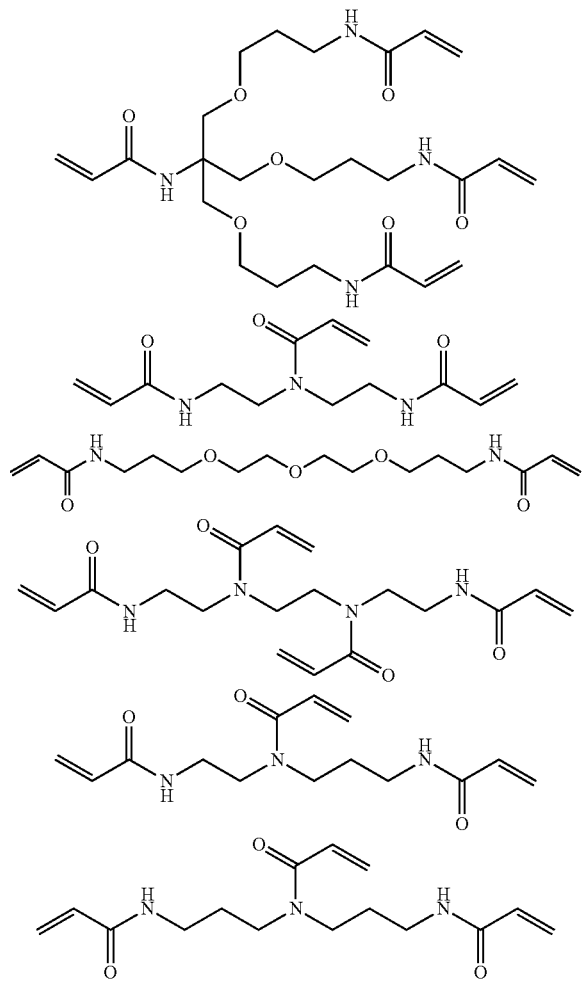

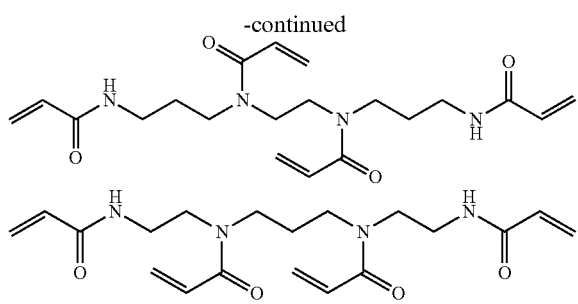

As the compound represented by General Formula (I) or (II), various commercially available products can be used or the compound can be synthesized by a method described in JP2013-502654A.

The polyfunctional (meth)acrylamide compound can be used alone or in combination of two or more kinds thereof.

(Content of Polyfunctional (Meth)Acrylamide Compound)

The content of the above-described polyfunctional (meth)acrylamide compound is preferably 10% by mass or greater and less than 90% by mass and more preferably in a range of 20% to 80% by mass with respect to the solid content (total solid content) of the composition.

The solid content in the composition indicates a component to be removed by drying the composition, specifically, a component obtained by removing a solvent from the composition of the present invention during the formation of a cured product. In other words, the solid content indicates a component finally forming a cured product and contains the polyfunctional (meth)acrylamide compound and the betaine monomer described above. In a case where the composition of the present invention contains other monomers described below and an initiator, these are included in the solid content.

[Betaine Monomer]

The betaine monomer contained in the composition of the present invention is at least one selected from the group consisting of compounds represented by General Formula (IV) to (VI).

A betaine indicates a compound (internal salt) which has a positive charge and a negative charge at positions which are not adjacent to each other in the same molecule and in which a hydrogen atom is not bonded to an atom having a positive charge and the entire molecule does not have a charge.

In a case where the composition of the present invention contains a betaine monomer, a coating to be obtained has excellent hydrophilicity and can exhibit antifogging properties.

<Compound Represented by General Formula (IV)>

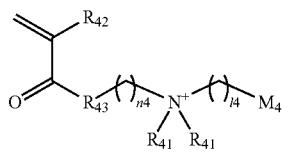

General Formula (IV)

In General Formula (IV), $R_{41}$ represents a methyl group, an ethyl group, an n-propyl group, or an i-propyl group. A plurality of $R_{41}$'s may be the same as or different from each other. From the viewpoint of easily synthesizing monomers, it is preferable that both $R_{41}$'s represent the same substituent. Among these, it is particularly preferable that $R_{41}$ represents a methyl group.

$R_{42}$ represents a hydrogen atom or a methyl group.

$R_{43}$ represents —NH— or —O—.

n4 represents an integer of 1 to 4. In a case where n4 represents a large integer and an alkylene chain of this portion is extremely long, the composition of the present invention may further contain a solvent or the solubility in a solvent may be degraded. From this viewpoint, it is particularly preferable that n4 represents 3 in a case where $M_4$ in General Formula (IV) represents $SO_3^-$. It is particularly preferable that n4 represents 2 in a case where $M_4$ in General Formula (IV) represents $COO^-$.

l4 represents an integer of 1 to 4. In a case where l4 represents a large integer and an alkylene chain of this portion is extremely long, the composition of the present invention may further contain a solvent or the solubility in a solvent may be degraded. From this viewpoint, it is particularly preferable that l4 represents 4 in a case where $M_4$ in General Formula (IV) represents $SO_3^-$. It is particularly preferable that l4 represents 1 in a case where $M_4$ in General Formula (IV) represents $COO^-$.

In the present specification, a betaine monomer having $SO_3^-$ is referred to as a sulfobetaine monomer in some cases. Further, a betaine monomer having $COO^-$ is referred to as a carboxybetaine monomer in some cases.

In General Formula (IV), $M_4$ represents $SO_3^-$ or $COO^-$. In a case where $M_4$ represents $SO_3^-$, the betaine monomer corresponds to a sulfobetaine monomer. In a case where $M_4$ represents $COO^-$, the betaine monomer corresponds to a carboxybetaine monomer.

In the case where $M_4$ in General Formula (IV) represents $SO_3^-$, it is preferable that $R_{43}$ represents —NH—.

In the case where $M_4$ in General Formula (IV) represents $COO^-$, it is preferable that $R_{43}$ represents —O—.

Examples of the compound represented by Formula (IV) include a compound represented by Formula (IV-1) (a compound 6 used in an example described below); N-(4-sulfoalkyl)-N-((meth)acryloylaminoalkyl)-N,N-dialkylammonium betaine such as N-(4-sulfobutyl)-N-(methacryloylaminopropyl)-N,N-dimethylammonium betaine; N-(4-sulfoalkyl)-N-((meth)acryloyloxyalkyl)-N,N-dialkylammonium betaine such as N-(3-sulfopropyl)-N-(methacryloxyethyl)-N,N-dimethylammonium betaine; and a compound represented by Formula (IV-2) (GLBT used in the example described below: N-methacryloyloxyethyl-N,N-dimethylammoniummethyl-α-carboxybetaine).

Compound 6

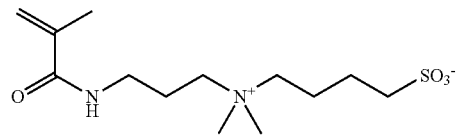

(IV-1)

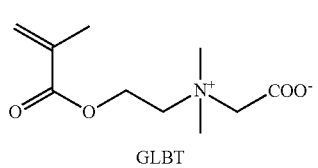

(IV-2)

GLBT

It is preferable that the compound represented by Formula (IV) is a compound represented by Formula (IV-1) or a compound represented by Formula (IV-2).

<Compound Represented by General Formula (V)>

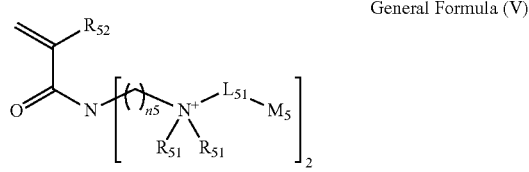

General Formula (V)

In General Formula (V), $R_{51}$ represents a methyl group, an ethyl group, an n-propyl group, or an i-propyl group. A plurality of $R_{51}$'s may be the same as or different from each other. From the viewpoint of easily synthesizing monomers, it is preferable that both $R_{51}$'s represent the same substituent. Among these, it is particularly preferable that $R_{51}$ represents a methyl group.

Further, two structures in "[ ]" in General Formula (V) may be the same as or different from each other, but it is preferable that the structures are the same as each other from the viewpoint of convenience of synthesis.

$R_{52}$ represents a hydrogen atom or a methyl group.

n5 represents an integer of 1 to 4. In a case where n5 represents a large integer and an alkylene chain of this portion is extremely long, the composition of the present invention may further contain a solvent or the solubility in a solvent may be degraded. From this viewpoint, it is particularly preferable that n5 represents 3 in a case where $M_5$ in General Formula (V) represents $SO^{3-}$. In General Formula (V), two n5's may be the same as or different from each other.

$L_{51}$ represents a linear or branched alkylene group having 3 or 4 carbon atoms, and the following structure is exemplified as a specific example thereof (the symbol "*" represents a bonding site).

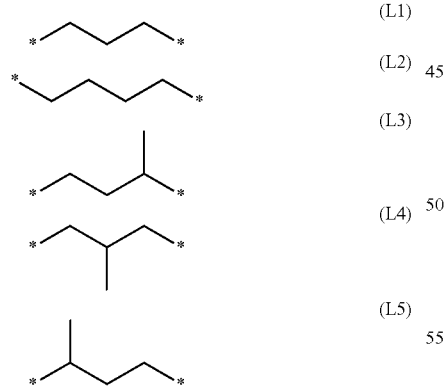

From the viewpoint that the effects of the present invention are suitably exhibited, it is particularly preferable that $L_{51}$ represents an n-butylene group (L2). In General Formula (V), two $L_{51}$'s may be the same as or different from each other.

$M_5$ represents $SO^{3-}$ or $COO^-$. In General Formula (V), two $M_5$'s may be the same as or different from each other.

In General Formula (V), an embodiment in which two $M_5$'s represent $SO^{3-}$ is exemplified as a preferred aspect.

It is preferable that the compound represented by General Formula (V) is a compound represented by General Formula (V-1) (a compound 7 used in an example described below).

Compound 7

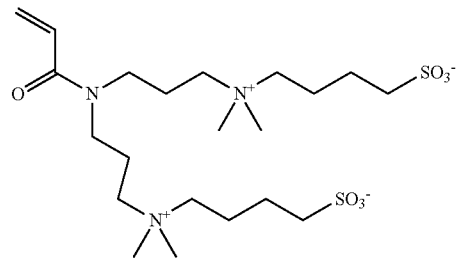

<Compound Represented by General Formula (VI)>

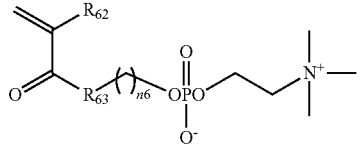

General Formula (VI)

In General Formula (VI), $R_{62}$ represents a hydrogen atom or a methyl group.

$R_{63}$ represents —NH— or —O—. It is preferable that $R_{63}$ represents —O—.

n6 represents an integer of 1 to 4. In a case where n represents a large integer and an alkylene chain of this portion is extremely long, the composition of the present invention may further contain a solvent or the solubility in a solvent may be degraded. In General Formula (VI), it is particularly preferable that n6 represents 2.

It is preferable that the compound represented by General Formula (VI) is a compound represented by Formula (VI-1) (MPC used in an example described below: 2-methacryloyloxyethyl phosphorylcholine).

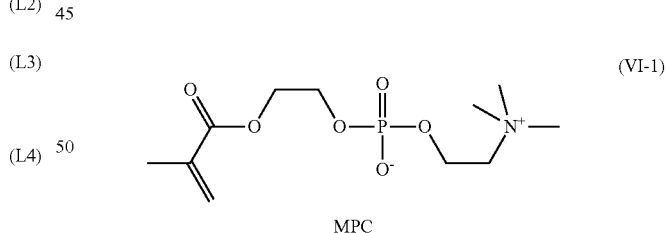

MPC

The above-described betaine monomer can be synthesized using a conventional method. For example, the synthesis can be performed by referring to synthesis examples and exemplary compounds disclosed in JP2012-187907A and JP2012-31400A. Specifically, for example, a (meth)acrylamide compound containing an amino group is obtained by reacting a predetermined polyamine compound with a (meth)acrylic acid chloride compound. Here, a compound having a sulfobetaine structure can be obtained by reacting a sultone compound having a predetermined number of carbon atoms with the obtained (meth)acrylamide compound. Specifically, this process can be carried out by referring to, for example, the description in paragraphs [0189] to [0193] of JP2012-31400A.

The betaine monomer can be used alone or in combination of two or more kinds thereof.

(Mass Ratio Between Polyfunctional (Meth)Acrylamide Compound and Betaine Monomer)

In the present invention, from the viewpoint of excellent effects of the present invention, the mass ratio between the polyfunctional (meth)acrylamide compound and the betaine monomer (polyfunctional (meth)acrylamide compound:betaine monomer) is preferably in a range of 10:90 to 90:10 (10/90 to 90/10) and more preferably in a range of 10:90 to 50:50 (10/90 to 50/50).

(Content of Polyfunctional (Meth)Acrylamide Compound and Betaine Monomer)

Further, the content of the polyfunctional (meth)acrylamide compound and the betaine monomer (total content of the polyfunctional (meth)acrylamide compound and the betaine monomer) in the composition of the present invention is preferably 80% by mass or greater and more preferably in a range of 90% to 99% by mass with respect to the solid content of the composition.

(Other Monomers)

The composition of the present invention may contain monomers (for example, monofunctional monomers) other than the polyfunctional (meth)acrylamide compound and the betaine monomer described above.

Examples of the monofunctional monomers include hydroxy group-containing (meth)acrylate such as 2-hydroxyethyl (meth)acrylate, 2-hydroxypropyl (meth)acrylate, 2-hydroxybutyl (meth)acrylate, 4-hydroxybutyl (meth)acrylate, or glycerin mono(meth)acrylate; (meth)acrylic acid and a carboxylate thereof; nitrogen atom-containing (meth)acrylate such as dimethylaminoethyl (meth)acrylate or 2-morpholinoethyl (meth)acrylate; (meth)acrylate having an ether bond such as methoxyethyl (meth)acrylate, 3-methoxybutyl (meth)acrylate, methoxydipropylene glycol (meth)acrylate, methoxytripropylene glycol (meth)acrylate, methoxypolyethylene glycol (meth)acrylate, or phenoxyethyl (meth)acrylate; and a mono(meth)acrylamide compound having one (meth)acrylamide bond in one molecule such as (meth)acrylamide, 2-hydroxyethyl (meth)acrylamide, 2-acrylamido-2-methylpropanesulfonic acid, and a sulfonate thereof.

Particularly, it is preferable that the composition of the present invention contains a monofunctional (meth)acryl compound containing a hydroxy group or a monofunctional (meth)acrylamide compound containing a hydroxy group as monomers (other monomers) other than the polyfunctional (meth)acrylamide compound and the betaine monomer described above.

Specific examples of the monofunctional (meth)acryl compound containing a hydroxy group include 2-hydroxyethyl (meth)acrylate, 2-hydroxypropyl (meth)acrylate, 2-hydroxybutyl (meth)acrylate, 4-hydroxybutyl (meth)acrylate, and glycerin mono(meth)acrylate.

Examples of the monofunctional (meth)acrylamide compound containing a hydroxy group include 2-hydroxyethyl (meth)acrylamide.

Other monomers may be used alone or in combination of two or more kinds thereof.

In a case where the composition of the present invention contains other monomers, the content of other monomers is not particularly limited, but is preferably in a range of 0.1% to 90% by mass and more preferably in a range of 1% to 50% by mass with respect to the solid content in the composition.

Further, the content of other monomers can be set to be in a range of 0% to 20% by mass with respect to the solid content in the composition.

(Initiator)

It is preferable that the composition of the present invention further contains an initiator. Examples of the initiator include a photopolymerization initiator and a thermal polymerization initiator. Among these, it is preferable that the composition of the present invention further contains a photopolymerization initiator.

Examples of the photopolymerization initiator include an alkyne phenone-based photopolymerization initiator, a methoxy ketone-based photopolymerization initiator, an acylphosphine oxide-based photopolymerization initiator, a hydroxy ketone-based photopolymerization initiator (such as IRGACURE 184; 1,2-α-hydroxyalkylphenone), an aminoketone-based photopolymerization initiator (such as 2-methyl-1-[4-(methylthio)phenyl]-2-morpholino-propan-1-one (IRGACURE (registered trademark) 907)), an oxime-based photopolymerization initiator, and an oxyphenyl acetic acid ester-based photopolymerization initiator (IRGACURE (registered trademark) 754).

Examples of other initiators (such as thermal polymerization initiators) include an azo-based polymerization initiator (such as V-50), a persulfate-based polymerization initiator, a peroxide-based polymerization initiator, a redox-based polymerization initiator.

Further, the initiator may be a water-soluble initiator or an oil-soluble initiator, but a water-soluble initiator is preferable. The initiator may be used alone or in combination of two or more kinds thereof.

The content of the initiator in the composition of the present invention is not particularly limited, but is preferably 0.5% by mass or greater and less than 10% by mass and more preferably in a range of 1.0% to 5.0% by mass with respect to the solid content in the composition.

Preferred Aspect of Initiator

It is preferable that the composition of the present invention further contains a compound represented by General Formula (VII) as an initiator. This compound can function as a so-called photopolymerization initiator.

General Formula (VII)

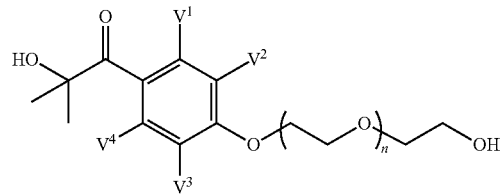

In General Formula (VII), $V^1$, $V^2$, $V^3$, and $V^4$ each independently represent a hydrogen atom or a substituent.

The kind of substituent is not particularly limited, and examples thereof include a halogen atom, an alkyl group, an alkoxy group, a hydroxy group, an alkylthio group, a mercapto group, an acyl group, and an amino group.

As the halogen atom, a fluorine atom, a chlorine atom, a bromine atom, or an iodine atom is preferable; a chlorine atom or a bromine atom is more preferable; and a chlorine atom is particularly preferable.

The number of carbon atoms contained in the alkyl group is not particularly limited, but is preferably in a range of 1 to 6 and more preferably in a range of 1 to 3. The alkyl group may be a linear alkyl group or a branched alkyl group. Further, the alkyl group may have an alicyclic structure. Specific examples of the alkyl group include a methyl group, an ethyl group, an n-propyl group, an isopropyl group, an n-butyl group, an s-butyl group, a t-butyl group, an n-pentyl group, an n-hexyl group, and a cyclohexyl group. Among these, a methyl group, an ethyl group, an n-propyl group, and an isopropyl group are preferable.

The number of carbon atoms contained in the alkoxy group is not particularly limited, but is preferably in a range of 1 to 6 and more preferably in a range of 1 to 3. The alkoxy group may be a linear alkoxy group or a branched alkoxy group. Further, the alkoxy group may have an alicyclic structure. Specific examples of the alkoxy group include a methoxy group, an ethoxy group, an n-propyloxy group, an isopropyloxy group, an n-butoxy group, an s-butoxy group, a t-butoxy group, an n-pentyloxy group, an n-hexyloxy group, and a cyclohexyloxy group. Among these, a methoxy group, an ethoxy group, an n-propyloxy group, and an isopropyloxy group are preferable.

The number of carbon atoms contained in the alkylthio group is not particularly limited, but is preferably in a range of 1 to 6 and more preferably in a range of 1 to 4. The alkylthio group may be a linear alkylthio group or a branched alkylthio group. Further, the alkylthio group may have an alicyclic structure. Specific examples of the alkylthio group include a methylthio group, an ethylthio group, an n-propylthio group, an isopropylthio group, an n-butylthio group, an s-butylthio group, a t-butylthio group, an n-pentylthio group, an n-hexylthio group, and a cyclohexylthio group. Among these, a methylthio group, an ethylthio group, an n-propylthio group, and an isopropylthio group are preferable.

The number of carbon atoms contained in the acyl group is not particularly limited, but is preferably in a range of 1 to 6 and more preferably in a range of 1 to 3. The acyl group may be a linear acyl group or a branched acyl group. Specific examples of the acyl group include a formyl group, an acetyl group, an ethylacyl group, an n-propylacyl group, and an isopropylacyl group. Among these, a formyl group, an acetyl group, and an ethylacyl group are preferable.

Examples of the amino group include a primary amino group (—$NH_2$), a secondary amino group (—NHR), and a tertiary amino group (—$NR_2$). Here, R represents a hydrocarbon group (for example, an alkyl group having 1 to 6 carbon atoms). Two R's in a tertiary amino group may be the same as or different from each other. Specific examples of the amino group include a dimethylamino group and a diethylamino group.

In General Formula (VII), n represents an integer of 1 to 5. From the viewpoint of excellent effects of the present invention, an integer of 1 to 3 is preferable, an integer of 1 or 2 is more preferable, and 1 is still more preferable.

The compound represented by General Formula (VII) may be used alone or in combination of two or more kinds thereof.

Specific examples of the compound represented by General Formula (VII) are listed n Table 1, but the compound represented by General Formula (VII) is not limited thereto.

TABLE 1

| | General Formula (VII) | | | |
|---|---|---|---|---|
| | n | $V^1$ | $V^2$ | $V^3$ | $V^4$ |
| (VII)-1 | 1 | H | H | H | H |
| (VII)-2 | 2 | H | H | H | H |
| (VII)-3 | 3 | H | H | H | H |

TABLE 1-continued

| | General Formula (VII) | | | |
|---|---|---|---|---|
| | n | $V^1$ | $V^2$ | $V^3$ | $V^4$ |
| (VII)-4 | 5 | H | H | H | H |
| (VII)-5 | 1 | $CH_3$ | H | H | H |
| (VII)-6 | 1 | H | $CH_3$ | H | H |
| (VII)-7 | 1 | H | $OCH_3$ | H | H |
| (VII)-8 | 1 | H | Cl | H | H |
| (VII)-9 | 1 | H | Br | H | H |
| (VII)-10 | 1 | H | OH | H | H |
| (VII)-11 | 1 | Cl | Cl | H | H |
| (VII)-12 | 1 | $SCH_3$ | H | H | H |
| (VII)-13 | 2 | Cl | H | Cl | H |
| (VII)-14 | 2 | H | $CH_3$ | H | H |
| (VII)-15 | 2 | H | $N(CH_3)_2$ | Cl | H |
| (VII)-16 | 2 | $CH_3$ | $CH_3$ | H | H |
| (VII)-17 | 3 | H | OH | H | H |
| (VII)-18 | 3 | H | $CH_3$ | H | H |
| (VII)-19 | 5 | H | $COCH_3$ | H | H |
| (VII)-20 | 5 | H | $CH_3$ | H | H |

A compound in a state of a liquid under a temperature condition of 23° C. is exemplified as one preferred aspect of the compound represented by General Formula (VII).

The compound represented by General Formula (VII) can be synthesized in conformity with a method described in paragraphs [0067] to [0071] and [0112] to [0115] of JP2000-186242A.

The content of the compound represented by General Formula (VII) in the composition of the present invention is not particularly limited, but is preferably 0.5% by mass or greater and less than 10% by mass and more preferably in a range of 1.0% to 5.0% by mass with respect to the solid content in the composition.

(Solvent)

As one preferred aspect, the composition of the present invention may further contain a solvent.

Examples of the solvent include water and organic solvents (such as esters ethyl acetate and n-butyl acetate; aromatic hydrocarbons such as toluene and benzene; aliphatic hydrocarbons such as n-hexane and n-heptane; alicyclic hydrocarbons such as cyclohexane and methyl cyclohexane; ketones such as methyl ethyl ketone and methyl isobutyl ketone; and alcohols such as methanol and butanol).

The solvent may be used alone or in combination of two or more kinds thereof.

In a case where the composition of the present invention further contains a solvent, from the viewpoint of excellent coatability, the content of the solid content in the composition is preferably in a range of 0.1% to 99% by mass and more preferably in a range of 1% to 90% by mass with respect to the total amount of the composition.

The content of the solvent can be set to a residual amount obtained by subtracting the content of the solid content from the total amount of the composition.

[Other Components]

The composition of the present invention contains components other than the above-described components. Examples of such components include a binder resin, a polyfunctional amine, a polyfunctional thiol, a surfactant, a plasticizer, a surface lubricant, a leveling agent, a softening agent, an antioxidant, an aging inhibitor, a light stabilizer, an ultraviolet absorbent, an inorganic or organic filler, and metal powder.

The binder resin is not particularly limited, and examples thereof include an acrylic resin, a styrene-based resin, a vinyl-based resin, a polyolefin-based resin, a polyesterbased resin, a polyurethane-based resin, a polyamide-based resin, a polycarbonate-based resin, a polydiene-based resin, an epoxy-based resin, a silicone-based resin, a cellulose-based polymer, and a chitosan-based polymer.

(Method of Preparing Curable Composition)

A method of preparing the composition of the present invention is not particularly limited, and a known method can be employed. For example, the composition can be prepared by mixing the above-described components and stirring the mixture using known means.

[Coating]

The coating of the present invention is a coating obtained by curing the above-described composition of the present invention using light or heat.

In the present invention, the coating means a coating film.

The coating of the present invention can become a hard coat having hydrophilicity by curing the composition of the present invention. The coating of the present invention can exhibit antifogging properties because the coating has hydrophilicity.

The thickness of the coating of the present invention is not particularly limited, but is preferably in a range of 0.1 to 300 µm and more preferably in a range of 1 to 100 µm.

(Method of Producing Coating)

The method of producing the coating of the present invention is not particularly limited, and a method of coating a base material with the above-described composition of the present invention and curing the composition of the present invention by heating or irradiating the composition with light (for example, ultraviolet rays, visible light rays, or X-rays) is exemplified.

The base material is not particularly limited, and various plastic base materials and glass base materials can be used.

As the plastic base materials, resin film base materials obtained by using polyethylene terephthalate, polybutylene terephthalate, polyethylene naphthalate, polyethylene, polypropylene, cellophane, diacetyl cellulose, triacetyl cellulose, acetyl cellulose butyrate, polyvinyl chloride, polyvinylidene chloride, polyvinyl alcohol, an ethylene-vinyl acetate copolymer, polystyrene, polycarbonate, polymethylpentene, polysulfone, polyether ether ketone, polyetherimide, polyimide, a fluorine resin, nylon, an acrylic resin, polyamide, cycloolefin, nylon, and polyethersulfone can be used. Among these, from the viewpoint of improving the mechanical strength, it is preferable to use a film formed of polyethylene terephthalate or polyethylene naphthalate.

As the base material, a base material which includes a primer layer on the surface thereof may be used for the purpose of improving the adhesiveness to the coating.

Further, for the purpose of further improving the adhesiveness to the coating, the base material may be subjected to a surface treatment such as a surface roughening treatment, a corona discharge treatment, a chromic acid treatment, a flame treatment, a hot air treatment, an ozone treatment, an ultraviolet irradiation treatment, or a surface oxidation treatment according to a sand blast method or a solvent treatment method.

Examples of the method of coating the base material with the curable composition include extrusion coating methods performed by roll coating, kiss roll coating, gravure coating, reverse coating, roll brush coating, spray coating, dip roll coating, bar coating, knife coating, air knife coating, curtain coating, rip coating, and die coating.

The method of heating the composition of the present invention is not particularly limited, and the composition can be heated using a blast dryer, an oven, an infrared dryer, or a heating drum.

The temperature of heating the composition is not particularly limited, but is preferably in a range of 30° C. to 150° C. and more preferably in a range of 40° C. to 120° C.

The time of heating the composition is not particularly limited, but can be set to be in a range of 1 to 20 minutes in a case of drying the composition in a coating device. The temperature of heating is preferably in a range of room temperature to 50° C., for example, in a case of drying the composition in the winding form behind a coating device.

Examples of the method of irradiating the composition of the present invention with light include methods of performing irradiation using a low-pressure mercury lamp, a medium-pressure mercury lamp, a high-pressure lamp, a metal halide lamp, Deep-UV light, a xenon lamp, a chemical lamp, and a carbon arc lamp. The energy of irradiating the composition with light is not particularly limited, but is preferably in a range of 0.1 to 10 J/cm$^2$.

(Use)

The coating of the present invention can be applied to, for example, a paint such as a self-repairing paint, a wood paint, or an antimicrobial paint; an adhesive such as a dental adhesive, a medical adhesive, or an adhesive for a recording material; an ink such as an inkjet ink, a printing ink, or an overprint vanish; a coating such as a coating agent for optical fibers, a buffer coating agent, a coating for glazing or head light, a building material coating, a hard coating agent for a cosmetic container, a coating agent for an electronic device, a silver-based transparent conductive film overcoat agent, a sealing material for an electronic device, a coating agent for kitchen appliances, a hybrid hard coating agent, an antifouling coating, or a material for a high weather-resistant coating; a functional membrane such as an ion exchange membrane, a reverse osmosis membrane, or a proton conductive membrane; a film such as a heat barrier film, a hard coat film, a diffusion film, a release film, a solar cell back sheet, an electromagnetic wave shield; a gas barrier film, a packaging film for food and medicine; an optical material such as an optical lens; a printing plate material such as an image forming material; a semiconductor material such as a dry film resist, a resist underlayer film, a material for nanoprinting, or a color resist material; a recording material such as a hard coating agent for a recording medium; a paper additive such as an additive for papermaking or a recording paper coating agent; a medical material such as a formulation, an artificial bond, or a contact lens; plastic such as a three-dimensional forming composition; a functional gel such as an electrolytic gel, a water absorption gel, an ionic gel, or a medical gel; and a cosmetic material such as a cosmetic gel.

[Laminate]

A laminate of the present invention is a laminate including a base material; and the coating of the present invention which is disposed on the base material.

In the present invention, the coating being disposed on the base material means that the coating is disposed on the surface of the base material. In a case where the base material is in the form of a film, a sheet, or a plate, the coating may be disposed on at least one surface of the base material. Further, the coating may be disposed on both surfaces of the base material.

In addition, the coating may be adjacent to the base material, and a third layer may be interposed between the coating and the base material. The third layer is not particularly limited. Examples of the third layer include a primer layer.

Examples of the base material used for the laminate of the present invention are the same as those of the base material described in the section of the coating of the present invention.

The coating included in the laminate of the present invention is not particularly limited as long as the coating of the laminate is the coating of the present invention.

The laminate of the present invention can be produced according to the method of producing the coating of the present invention described above.

Examples of the applications of the laminate of the present invention are the same as those of the coating of the present invention described above.

The laminate of the present invention will be described with reference to the accompanying drawing. The present invention is not limited to the accompanying drawing.

FIG. 1 is a cross-sectional view schematically illustrating an example of the laminate of the present invention.

In FIG. 1, a laminate 10 includes a base material 12; and a coating 14 which is disposed on the base material 12. The coating 14 is the coating of the present invention.

EXAMPLES

Hereinafter, the present invention will be described in detail with reference to examples, but the present invention is not limited thereto.

<Preparation of Polyfunctional (Meth)Acrylamide Compound>

(Synthesis of Compound 1)

A compound 1 was synthesized according to the following scheme.

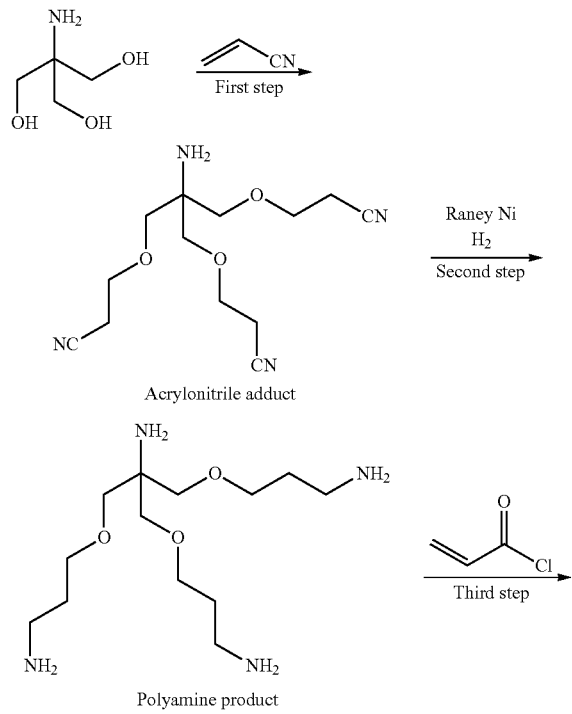

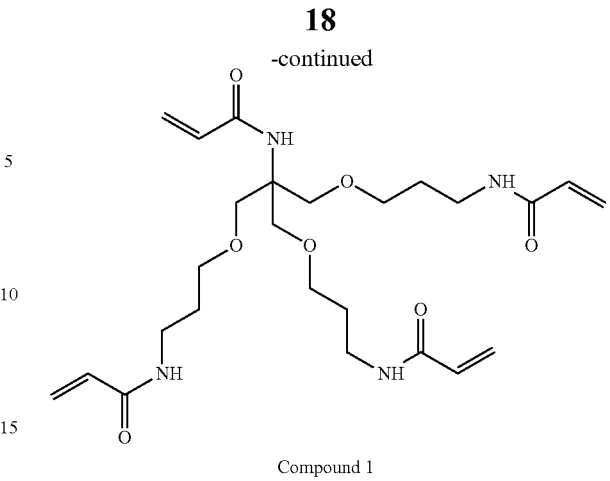

Compound 1

(First step)

121 g (1 equivalent) of tris(hydroxymethyl)aminomethane (manufactured by Tokyo Chemical Industry Co., Ltd.), 84 ml of a 50% potassium hydroxide aqueous solution, and 423 ml of toluene were added to a 1 L three-neck flask provided with a stirrer bar and stirred therein, and 397.5 g (7.5 equivalents) of acrylonitrile was added dropwise to the flask for 2 hours while the temperature of the reaction system was maintained to be in a range of 20° C. to 25° C. in a water bath. After the dropwise addition, the solution was stirred for 1.5 hours, 540 ml of toluene was added to the reaction system, and the reaction mixture was transferred to a separatory funnel so that the water phase was removed. The remaining organic phase was dried over magnesium sulfate, celite filtration was performed, and the solvent was distilled off under reduced pressure, thereby obtaining an acrylonitrile adduct. Since the results obtained by analyzing the obtained substance using $^1$H-NMR (abbreviation for proton-nuclear magnetic resonance spectroscopy, the same applies hereinafter) and MS (mass analysis method: abbreviation for mass spectrometry, the same applies hereinafter) coincided with the results of a known product, the resultant was not purified and used for the next reduction reaction.

(Second Step)

24 g of the acrylonitrile adduct obtained earlier, 48 g of a nickel catalyst (Raney Nickel 2400, manufactured by W. R. Grace and Company), 600 ml of a 25% solution containing ammonia water and methanol at a mixing ratio of 1:1 were added to a 1 L autoclave and suspended, and the autoclave was sealed. 10 MPa of hydrogen was introduced into the solution to cause a reaction at a reaction temperature of 25° C. for 16 hours.

Disappearance of the raw materials was confirmed using 1H-NMR, the reaction mixture was celite-filtered, and the celite was washed with methanol several times. The solvent of the filtrate was distilled off under reduced pressure, thereby obtaining a polyamine product. The obtained product was not purified and used for the next reaction.

(Third Step)

30 g of the polyamine product obtained earlier, 120 g (14 equivalents) of NaHCO$_3$, 1 L of dichloromethane, and 50 ml of water were added to a 2 L three-neck flask provided with a stirrer, 92.8 g (10 equivalents) of acrylic acid chloride was added dropwise to the flask for 3 hours in an ice bath, and the solution was stirred at room temperature for 3 hours. Disappearance of the raw materials was confirmed using $^1$H-NMR, the solvent of the reaction mixture was distilled off under reduced pressure, the reaction mixture was dried over magnesium sulfate and celite-filtered, and the solvent was distilled off under reduced pressure. Finally, the resultant was purified using column chromatography (ethyl acetate/methanol=4/1), thereby obtaining a white solid (yield of 40%) at room temperature. The yield in the third step was 40%.

The obtained white solid was identified using $^1$H-NMR under the following measurement conditions.

$^1$H-NMR solvent: deuterated chloroform, internal standard: tetramethylsilane (TMS)

Since the integral ratio of a peak of one hydrogen atom derived from an acryl at around 5.6 ppm was 4 while the integral ratio of a singlet peak (peak derived from a mother skeleton) at around 3.75 ppm was 6 based on the data of 1H-NMR, it was understood that the compound contained four acrylamide groups. From these results, it was confirmed that the compound of the white solid had a structure represented by the compound 1 according to the above-described scheme.

(Synthesis of Compound 2)

30 g of diethylenetriamine (manufactured by Tokyo Chemical Industry Co., Ltd.), 220.1 g of NaHCO$_3$, 1 L of dichloromethane, and 200 ml of water were added, as raw material amines, to a 2 L three-neck flask provided with a stirrer, 157.5 g of acrylic acid chloride was added dropwise to the flask for 3 hours in an ice bath, and the solution was stirred at room temperature for 1 hour. Disappearance of the raw materials was confirmed using $^1$H-NMR, the water phase was removed by performing a liquid separation treatment, the remaining organic phase was dried over magnesium sulfate, the magnesium sulfate was filtered using celite, and the solvent was distilled off under reduced pressure. Finally, the resultant was purified using column chromatography (ethyl acetate/methanol=4/1), thereby obtaining a white solid (yield of 54%) at room temperature. The obtained compound was used as a compound 2.

Further, the structures and the compound names of the compounds used in the examples are listed in Table 2.

(Synthesis of Compound 3)

30 g of diethylene glycol bis(3-aminopropyl)ether (manufactured by Tokyo Chemical Industry Co., Ltd.), 68.6 g of NaHCO$_3$, 1 L of dichloromethane, and 200 ml of water were added, as raw material amines, to a 2 L three-neck flask provided with a stirrer, 49.2 g of acrylic acid chloride was added dropwise to the flask for 3 hours in an ice bath, and the solution was stirred at room temperature for 1 hour. Disappearance of the raw materials was confirmed using $^1$H-NMR, the water phase was removed by performing a liquid separation treatment, the remaining organic phase was dried over magnesium sulfate, the magnesium sulfate was filtered using celite, and the solvent was distilled off under reduced pressure. Finally, the resultant was purified using column chromatography (ethyl acetate/methanol=4/1), thereby obtaining a white solid (yield of 44%) at room temperature. The obtained compound was used as a compound 3.

(Synthesis of Compound 4)

30 g of triethylenetetramine (manufactured by Sigma-Aldrich Co., LLC.), 206.6 g of NaHCO$_3$, 1 L of dichloromethane, and 200 ml of water were added, as raw material amines, to a 2 L three-neck flask provided with a stirrer, 148.4 g of acrylic acid chloride was added dropwise to the flask for 3 hours in an ice bath, and the solution was stirred at room temperature for 1 hour. Disappearance of the raw materials was confirmed using $^1$H-NMR, the water phase was removed by performing a liquid separation treatment, the remaining organic phase was dried over magnesium sulfate, the magnesium sulfate was filtered using celite, and the solvent was distilled off under reduced pressure. Finally, the resultant was purified using column chromatography (ethyl acetate/methanol=4/1), thereby obtaining a white solid (yield of 44%) at room temperature. The obtained compound was used as a compound 4.

(Synthesis of Compound 5)

30 g of bis(3-aminopropyl)amine (manufactured by Tokyo Chemical Industry Co., Ltd.), 301 g (14 equivalents with respect to a —NH$_2$ group contained in bis(3-aminopropyl)amine) of NaHCO$_3$, 1 L of dichloromethane, and 50 ml of water were added to a 2 L three-neck flask provided with a stirrer, and the three-neck flask was placed in an ice bath. Next, 232 g (10 equivalents with respect to the —NH$_2$ group) of acrylic acid chloride was added dropwise to the flask for 3 hours, and the solution was stirred at room temperature for 3 hours. Disappearance of the raw materials was confirmed using $^1$H-NMR, the solvent of the reaction mixture was distilled off under reduced pressure, the reaction mixture was dried over magnesium sulfate and celite-filtered, and the solvent was distilled off under reduced pressure. Finally, the resultant was purified using silica column chromatography (a mixed solvent of ethyl acetate and methanol at a volume ratio of 9:1 was used as a developing solvent), thereby obtaining a compound 5 (yield of 43%). The compound 5 was water-soluble. The melting point of the compound 5 was −27° C.

<Preparation of Betaine Monomer>

(Synthesis Example of Compound 6)

Dimethylaminopropylmethacrylamide (manufactured by Wako Pure Chemical Industries, Ltd., 119.18 g), acetonitrile (manufactured by Wako Pure Chemical Industries, Ltd., 350 g), and p-methoxyphenol (manufactured by Wako Pure Chemical Industries, Ltd., 0.060 g) were added to a 1 L three-neck flask provided with a stirring blade and a cooling tube, and 95.32 g of 1,4-butanesultone (manufactured by Wako Pure Chemical Industries, Ltd.) was added to the flask for 30 minutes while the solution was stirred. After the dropwise addition, the solution was heated at 80° C. for 5 hours. After the reaction, the reaction solution separated into two layers was allowed to stand at room temperature for 10 hours and, accordingly, a white solid was deposited from the underlayer. The white solid was recovered by suction filtration in a nitrogen atmosphere and stirred and washed in 800 ml of acetone. After the white solid was washed, the white solid was suction-filtered again and dried, thereby obtaining a compound 6 (192.15 g). The compound 6 is a compound represented by Formula (IV-1).

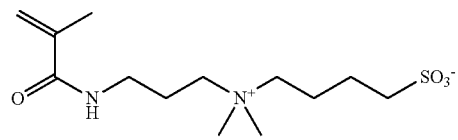

(IV-1)

(Synthesis Example of Compound 7)

25.10 g of 3,3'-iminobis(N,N-dimethylpropylamine), 31.02 g of potassium carbonate, 100 g of ethyl acetate, and 50 g of water were weighed in a 300 ml three-neck flask provided with a stirrer and a thermometer, and 11.76 g of acrylic acid chloride was added dropwise to the flask in an ice bath for 30 minutes. The solution was stirred at 0° C. for 30 minutes, and a white precipitate to be generated was separated by filtration. The organic phase was dried over anhydrous magnesium sulfate, and the solvent was distilled off under reduced pressure. The obtained yellow crude product was purified using alumina column chromatography (ethyl acetate/methanol development), thereby obtaining 7.73 g of N,N-bis(3-(dimethylamino)propyl)acrylamide.

7.73 g of N,N-bis(3-(dimethylamino)propyl)acrylamide obtained in the above-described manner, 3.0 mg of p-methoxyphenol, and 40 g of acetonitrile were weighed in a 200 ml three-neck flask provided with a stirrer, a thermometer, and a reflux tube. 8.77 g of 1,4-butanesultone was added dropwise to the flask at room temperature, and the solution was heated to 80° C. to cause a reaction for 4 hours. After the solution was allowed to be naturally cooled, the supernatant was removed by decantation, the purified white precipitate was reslurried using a mixture of 20 ml of methanol and 800 ml of ethyl acetate, and the precipitate was recovered by suction filtration in a nitrogen atmosphere. The resultant was dried in a decompression oven at 40° C., thereby obtaining a white solid compound 7 (15.30 g). The $^1$H-NMR measurement results of the white solid compound are described below. The compound 7 is a compound represented by Formula (V-1).

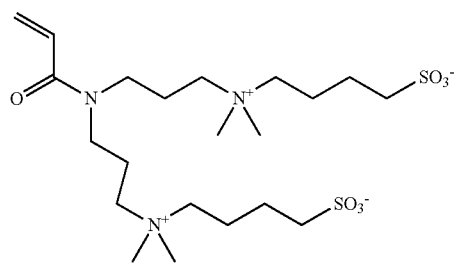

(V-1)

$^1$H-NMR (400 MHz, D$_2$O): δ=6.62 ppm (a: 1H, t), 6.16 ppm, 5.79 ppm (b, c: 2H, 2d), 3.40-3.15 ppm (d+e+f: 12H, m), 2.96 ppm (g: 12H, s), 2.84 ppm (h: 4H, t), 1.96-1.69 ppm (i+j+k: 12H, m)

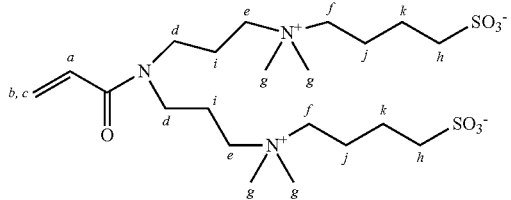

<Preparation of Compound 8>
(Synthesis of intermediate 1)

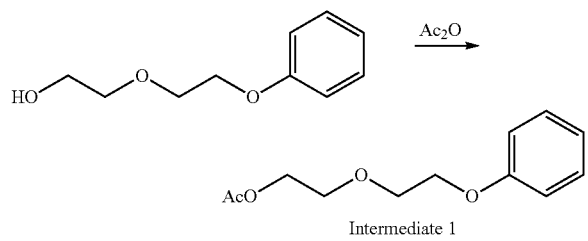

Intermediate 1

97.2 g (0.95 mol) of acetic anhydride was added dropwise to 170.0 g of phenyl diglycol (PhDG, manufactured by Nippon Nyukazai Co., Ltd.) (0.93 mol) which had been heated to 90° C., and the solution was heated and stirred at 120° C. for 6 hours. Thereafter, the resultant was concentrated under reduced pressure, thereby obtaining 204.4 g of an intermediate 1 (yield of 98%).

(Synthesis of Intermediate 2)

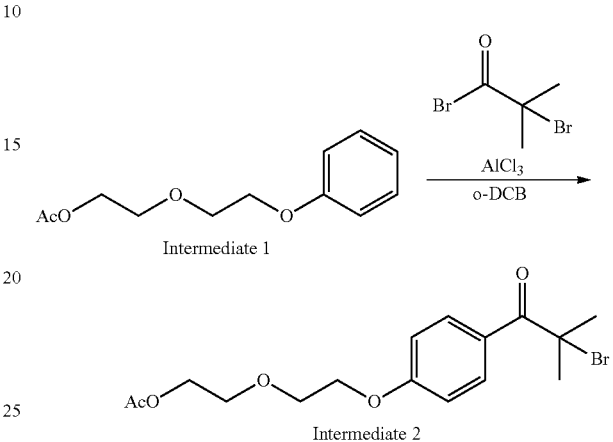

120.0 g (0.90 mol) of aluminum chloride (III) was added to 270 mL (2.39 mol) of o-dichlorobenzene (DCB) and the mixture was cooled to 0° C. 44.26 mL (0.36 mol) of 2-bromoisobutyric acid bromide was added dropwise to the mixture and then the solution was stirred for 15 minutes. Thereafter, the temperature of the reaction solution was maintained to 0° C., and 67.28 g of the intermediate 1 (0.30 mol) was added dropwise to the reaction solution for 30 minutes. The temperature of the reaction solution after the dropwise addition was returned to room temperature (22° C.) and the solution was stirred for 2 hours. Next, 300 mL of water which had been cooled to 5° C. was added to the reaction solution by dividing the water into several portions. The organic phase was washed with 300 ml of water twice and further washed with 135 mL of sodium bicarbonate water and 135 mL of saturated saline solution, and 300 mL of water was added to the organic phase and azeotropically concentrated under reduced pressure, thereby obtaining 110.8 g of an intermediate 2 (yield of 95%).

(Synthesis of Compound 8)

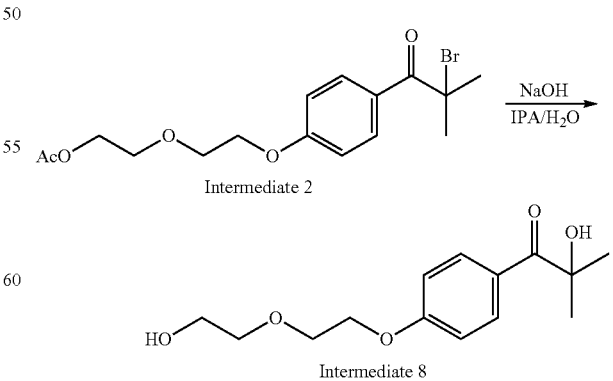

100.0 g (0.27 mol) of the intermediate 2 was dissolved in 200 mL of isopropanol, 214 g of a 25 mass % sodium hydroxide aqueous solution was added dropwise to the solution, and the solution was stirred for 2 hours. Thereafter, the stirring was stopped, and the organic phase was washed with saturated saline solution twice and neutralized with hydrochloric acid. The organic phase was concentrated under reduced pressure, 72 mL of methyl ethyl ketone was added thereto, and deposited salts were filtered. The filtrate was concentrated under reduced pressure, 72 mL of water was added thereto, and the solution was azeotropically concentrated under reduced pressure, thereby obtaining 56.8 g of a compound 8 (yield of 87%). The compound 8 was in a liquid state under a temperature condition of 23° C.

<Comparative Compound 1: Synthesis of Ditrimethylolpropane Tetraacrylamide>

250 g (1 mol) of ditrimethylolpropane, 444 g (4.4 mol) of N-methylolacrylamide, 0.3 g (0.002 mol) of hydroquinone monomethyl ether were added to 800 ml of dehydrated tetrahydrofuran (THF) in a four-neck separable flask, stirred, and dissolved therein. The separable flask was placed in an oil bath and the temperature of the oil bath was set to 50° C. Next, 0.3 g (0.0016 mol) of p-toluenesulfonic acid was added to the separable flask, and the solution was stirred for 1 hour in a nitrogen stream and neutralized with ammonia water diluted to 10% to finish the reaction. Next, the solvent was removed by performing evaporation or drying the solution in a vacuum, a paste-like reaction product obtained by removing the solvent was recrystallized, thereby synthesizing ditrimethylolpropane tetraacrylamide (comparative compound 1) which is a white powdery crystal.

<Preparation of Curable Composition>

400 parts by mass of methanol was added to the components listed in Table 2 and mixed using the proportions (parts by mass) listed in the same table, thereby preparing a curable composition.

<Preparation of Coating>

An easily adhesive polyethylene terephthalate film (manufactured by TOYOBO CO., LTD., COSMOSHINE A4100) was coated with the obtained curable composition using a bar coater and exposed to ultraviolet rays (UV) at an energy density of 0.5 J/cm2, thereby obtaining an initial coating (10 μm) on the film.

<Evaluation>

The composition or the initial coating obtained in the above-described manner was evaluated as follows. The results are listed in Table 2.

(Appearance of Composition)

The appearance of each curable composition obtained in the above-described manner was visually confirmed under a temperature condition of 25° C.

A case where the composition was transparent was indicated as "clear".

A case where the composition was clouded was indicated as "cloudy".

(Expression of Antifogging Properties and Exhalation)

Under a temperature condition of 25° C. at a relative humidity of 50% in the atmosphere, exhalation was blown into the obtained initial coating for 3 seconds, the surface of the coating was visually observed, and the antifogging properties were evaluated based on the following evaluation standard. The item A or B is preferable.

A: The surface was not clouded.
B: The surface was slightly clouded.
C: The entire surface of the coating was clouded.

(Expression of Antifogging Properties and Hot Water)

Under a temperature condition of 25° C. at a relative humidity of 50% in the atmosphere, the obtained initial coating was placed on a beaker, to which hot water at 80° C. was added, for 10 seconds such that the initial coating was brought into contact with vapor, the surface of the coating was visually observed, and the antifogging properties were evaluated based on the following evaluation standard. The distance between the water surface and the initial coating was 5 cm. The item A or B was preferable.

A: The surface was not clouded.
B: The surface was slightly clouded.
C: The entire surface of the coating was clouded.

(Antifogging Durability and Hot Water after Friction Test)

The initial coating obtained in the above-described manner was immersed in pure water at 25° C. such that the surface of the coating was directed upward, 500 g of a load was applied thereto in water, and a friction test was performed by reciprocating cloth for eyeglasses on the initial coating 50 times. The coating obtained after the friction test was taken out of water, and the same test for expressing antifogging properties as described above (expression of antifogging properties and hot water) was performed and the antifogging properties were evaluated based on the following evaluation standard. The item A or B is preferable.

A: The surface was not clouded.
B: The surface was slightly clouded.
C: The entire surface of the coating was clouded.

(Antifogging Durability and Pencil Hardness)

The pencil hardness of the coating obtained after the friction test as described above was measured based on the test method described in JIS K5401. The obtained results were evaluated based on the following standard. The item A or B is preferable. The evaluation results (A to C) and the hardness results (3H to B) of the pencil hardness are collectively listed in Table 2.

A: The pencil hardness was H or higher.
B: The pencil hardness was in a range of HB to F.
C: The pencil hardness was B or lower.

TABLE 2

| | Polyfunctional (meth)acrylamide compound | | | | | Betaine monomer | | | | |
|---|---|---|---|---|---|---|---|---|---|---|
| | Compound 1 | Compound 2 | Compound 3 | Compound 4 | Compound 5 | Comparative compound 1 | Compound 6 | Compound 7 | GLBT | MPC | Comparative compound 2 |
| Example 1 | 30 | | | | | | 67 | | | | |
| Example 2 | | 30 | | | | | 67 | | | | |
| Example 3 | | | 30 | | | | 67 | | | | |
| Example 4 | | | | 30 | | | 67 | | | | |

TABLE 2-continued

| | Col A | Col B | Col C | Col D | Col E | Col F |
|---|---|---|---|---|---|---|
| Example 5 | | | 30 | 67 | | |
| Example 6 | 30 | | | | 67 | |
| Example 7 | 85 | | | 12 | | |
| Example 8 | 12 | | | 85 | | |
| Example 9 | 30 | | | 47 | | |
| Example 10 | 7 | | | 90 | | |
| Example 11 | 90 | | | 7 | | |
| Example 12 | 30 | | | | 67 | |
| Example 13 | 30 | | | | | 67 |
| Example 14 | 30 | | | 67 | | |
| Comparative Example 1 | | | | | | |
| Comparative Example 2 | 30 | | | | | |
| Comparative Example 3 | | | | 67 | | |
| Comparative Example 4 | 30 | | | | | 67 |
| Comparative Example 5 | | | 30 | 67 | | |
| Comparative Example 6 | | | 30 | | 67 | |

| | Polyfunctional acrylate DPHA | Monofunctional monomer HEMA | Initiator Compound 8 | Initiator V-50 | Appearance of composition | Expression of antifogging properties Exhalation | Expression of antifogging properties Hot water | Antifogging durability Hot water after friction test | Pencil hardness | Comprehensive evaluation |
|---|---|---|---|---|---|---|---|---|---|---|
| Example 1 | | | 3 | | Clear | A | A | A | A (2H) | A |
| Example 2 | | | 3 | | Clear | A | A | A | A (2H) | A |
| Example 3 | | | 3 | | Clear | A | A | A | A (2H) | A |
| Example 4 | | | 3 | | Clear | A | A | A | A (2H) | A |
| Example 5 | | | 3 | | Clear | A | A | A | A (2H) | A |
| Example 6 | | | 3 | | Clear | A | A | A | A (3H) | A |
| Example 7 | | | 3 | | Clear | A | A | A | A (3H) | A |
| Example 8 | | | 3 | | Clear | A | A | A | B (H) | A |
| Example 9 | | 20 | 3 | | Clear | A | A | A | A (2H) | A |
| Example 10 | | | 3 | | Clear | A | A | B | B (HB) | B |
| Example 11 | | | 3 | | Clear | B | B | B | A (3H) | B |
| Example 12 | | | 3 | | Clear | B | B | B | A (2H) | B |
| Example 13 | | | 3 | | Clear | B | B | B | A (2H) | B |
| Example 14 | | | | 3 | Clear | A | A | A | A (2H) | A |
| Comparative Example 1 | 30 | 67 | 3 | | Clear | C | C | C | A (3H) | C |
| Comparative Example 2 | | 67 | 3 | | Clear | C | C | C | A (2H) | C |
| Comparative Example 3 | 30 | | 3 | | Cloudiness | C | C | C | C (B) | C |
| Comparative Example 4 | | | 3 | | Clear | C | C | C | A (2H) | C |
| Comparative Example 5 | | | 3 | | Cloudiness | C | C | C | C (B) | C |
| Comparative Example 6 | | | 3 | | Cloudiness | C | C | C | C (B) | C |

The details of the respective components in Table 2 are as follows.

(Polyfunctional (Meth)Acrylamide Compound)

The compounds 1 to 5 produced as described above and represented by the following formulae were used as the polyfunctional (meth)acrylamide compound.

Compound 1

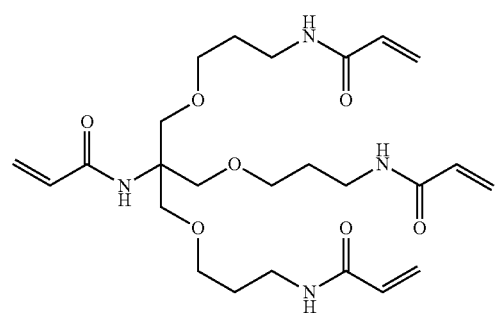

Compound 2

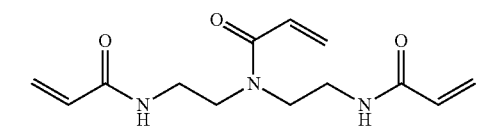

Compound 3

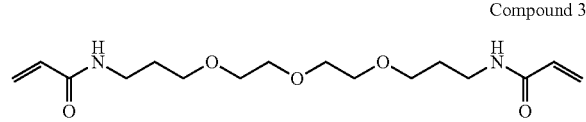

Compound 4

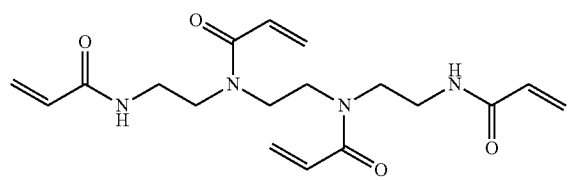

Compound 5

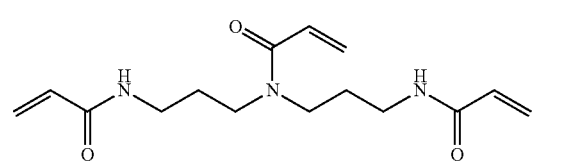

Comparative compound 1: ditrimethylolpropane tetraacrylamide synthesized as described above and represented by the following formula

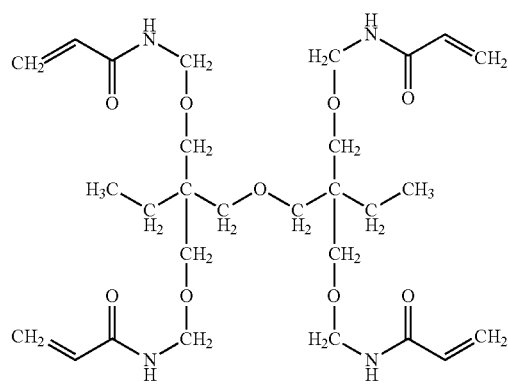

(Betaine Monomer)

The following compounds were used as the betaine monomer. The compounds 6 and 7 are compounds prepared as described above.

Compound 6

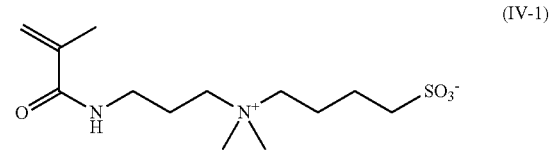
(IV-1)

Compound 7

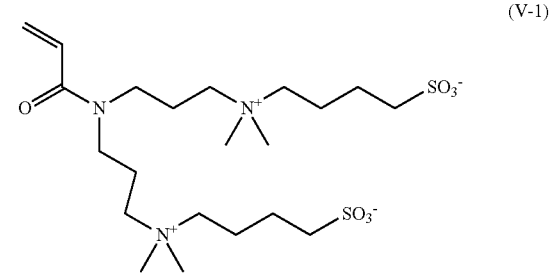
(V-1)

GLBT: N-methacryloyloxyethyl-N,N-dimethylammoniummethyl-α-carboxybetaine (manufactured by OSAKA ORGANIC CHEMICAL INDUSTRY LTD.). The compound is represented by Formula (IV-2).

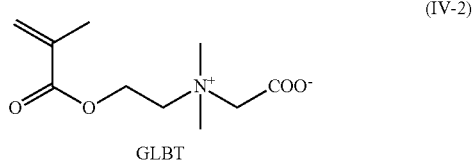
(IV-2)

GLBT

MPC: 2-methacryloyloxyethyl phosphorylcholine (manufactured by NOF Corporation). The compound is represented by Formula (VI-1).

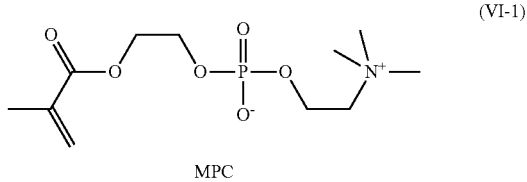 [SMILES: C=C(C)C(=O)OCCOP(=O)([O-])OCC[N+](C)(C)C]

(VI-1)

MPC

Comparative compound 2: 2-(acryloylamino)-N,N,N-trimethylethane ammonium chloride (manufactured by Kohjin Co., Ltd.)

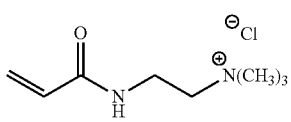

(Polyfunctional Acrylate)
DPHA: dipentaerythritol hexaacrylate (manufactured by Wako Pure Chemical Industries, Ltd.)
(Monofunctional Monomer)
HEMA: 2-hydroxyethyl methacrylate (manufactured by Wako Pure Chemical Industries, Ltd.)
(Initiator)
Compound 8: compound prepared as described above and represented by the following formula

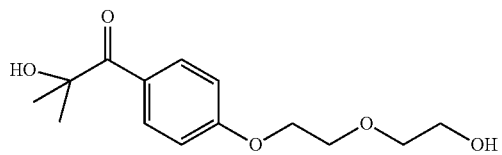 [SMILES: CC(C)(O)C(=O)c1ccc(OCCOCCO)cc1]

V-50: V-50 (water-soluble azo-based thermal initiator) (manufactured by Wako Pure Chemical Industries, Ltd.)

As understood from Table 2, in the coating obtained in Comparative Example 1 which contained polyfunctional acrylate and a monofunctional monomer in place of using a specific polyfunctional (meth)acrylamide compound and a specific betaine monomer, fogging occurred and antifogging durability was not exhibited.

In both of the coatings obtained in Comparative Examples 2 and 3 without using a specific polyfunctional (meth)acrylamide compound and a specific betaine monomer, fogging occurred and antifogging durability was not exhibited. Further, the hardness of the coating of Comparative Example 3 was low.

In the coating obtained in Comparative Example 4 which contained a monomer having salts (a cation and an anion are adjacent to each other) in place of using a specific betaine monomer, fogging occurred and antifogging durability was not exhibited.

In both of the coatings obtained in Comparative Examples 5 and 6 which respectively contained a polyfunctional (meth)acrylamide compound having a different structure in place of using a specific polyfunctional (meth)acrylamide compound, fogging occurred, antifogging durability was not exhibited, and the hardness was low.

On the contrary, all coatings obtained in Examples 1 to 14 by using a specific polyfunctional (meth)acrylamide compound exhibited desired effects.

In comparison between Examples 7 and 11, in a case where the mass ratio of the polyfunctional (meth)acrylamide compound was 90 or less in the mass ratio between the polyfunctional (meth)acrylamide compound and the betaine monomer, the expression of antifogging properties and the antifogging durability was excellent.

Further, in comparison of Examples 10, 8, 1, and 7 to one another, as the ratio of the polyfunctional (meth)acrylamide compound was increased in the mass ratio between the polyfunctional (meth)acrylamide compound and the betaine monomer, the pencil hardness was increased and the antifogging durability were excellent.

In comparison of Example 1 to Examples 7 and 11, as the ratio of the polyfunctional (meth)acrylamide compound was increased in the mass ratio between the polyfunctional (meth)acrylamide compound and the betaine monomer, the hardness of the coating to be obtained was not high.

In comparison of Example 1 to Examples 1, 12 and 13, expression of antifogging properties and antifogging durability were excellent in the case where the coating contained a sulfobetaine monomer represented by General Formula (IV) as the betaine monomer (Example 1) compared to the case where the coating contained a carboxybetaine monomer represented by General Formula (IV) (Example 12) or a compound represented by General Formula (VI) (Example 13).

Further, in comparison between Examples 1 and 6, each of which a sulfobetaine monomer was used, the hardness of the coating was higher and the hardness of the coating to be obtained was the highest in the case where the coating contained a compound represented by General Formula (V) (Example 6) compared to the case where the coating contained a compound represented by General Formula (IV) (Example 1).

EXPLANATION OF REFERENCES

10: laminate
12: base material
14: coating

What is claimed is:
1. A curable composition comprising:
   at least one polyfunctional (meth)acrylamide compound selected from the group consisting of a compound represented by General Formula (I) and a compound represented by General Formula (II); and
   at least one betaine monomer selected from the group consisting of compounds represented by General Formula (IV) to (VI),

General Formula (I)

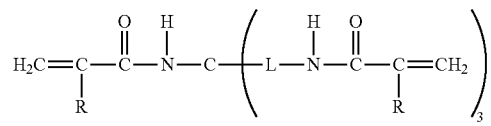

in General Formula (I), R's each independently represent a hydrogen atom or a methyl group, and L's each independently represent —O—, an alkylene group having 2 to 4 carbon atoms, or a divalent linking group formed by combining these,

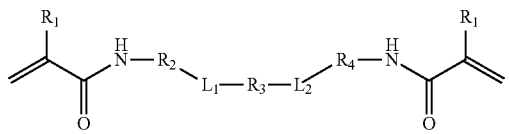

General Formula (II)

in General Formula (II), $R_1$'s each independently represent a hydrogen atom or a methyl group, $R_2$ and $R_4$ each independently represent —O—, an alkylene group having 1 to 4 carbon atoms, a divalent linking group formed by combining these, $R_3$ represents —O—, an alkylene group having 1 to 4 carbon atoms, a group represented by General Formula (III), or a divalent linking group formed by combining these, and $L_1$ and $L_2$ each independently represent a single bond or a group represented by General Formula (III),

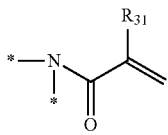

General Formula (III)

in General Formula (III), $R_{31}$ represents a hydrogen atom or a methyl group, and the symbol "*" represents a bonding site,

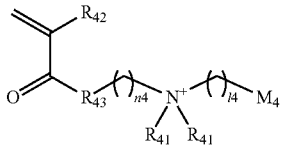

General Formula (IV)

in General Formula (IV), $R_{41}$ represents a methyl group, an ethyl group, an n-propyl group, or an i-propyl group, and a plurality of $R_{41}$'s may be the same as or different from each other,
$R_{42}$ represents a hydrogen atom or a methyl group,
$R_{43}$ represents —NH— or —O—,
n4 represents an integer of 1 to 4,
l4 represents an integer of 1 to 4, and
$M_4$ represents $SO^{3-}$ or $COO^-$,

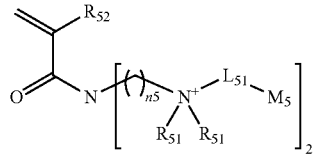

General Formula (V)

in General Formula (V), $R_{51}$ represents a methyl group, an ethyl group, an n-propyl group, or an i-propyl group, and a plurality of $R_{51}$'s may be the same as or different from each other, $R_{52}$ represents a hydrogen atom or a methyl group,
n5 represents an integer of 1 to 4 and two n5's may be the same as or different from each other,
$L_{51}$ represents a linear or branched alkylene group having 3 or 4 carbon atoms and two $L_{51}$'s may be the same as or different from each other, and
$M_5$ represents $SO^{3-}$ or $COO^-$, and two $M_5$'s may be the same as or different from each other, and

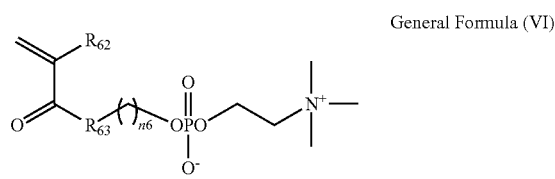

General Formula (VI)

in General Formula (VI), $R_{62}$ represents a hydrogen atom or a methyl group,
$R_{63}$ represents —NH— or —O—, and
n6 represents an integer of 1 to 4.

2. The curable composition according to claim 1, wherein the mass ratio between the polyfunctional (meth)acrylamide compound and the betaine monomer is in a range of 10:90 to 90:10.

3. The curable composition according to claim 1, wherein the content of the polyfunctional (meth)acrylamide compound is 10% by mass or greater and less than 90% by mass with respect to the solid content of the composition.

4. The curable composition according to claim 2, wherein the content of the polyfunctional (meth)acrylamide compound is 10% by mass or greater and less than 90% by mass with respect to the solid content of the composition.

5. A coating which is obtained by curing the curable composition according to claim 1 using light or heat.

6. A coating which is obtained by curing the curable composition according to claim 2 using light or heat.

7. A coating which is obtained by curing the curable composition according to claim 3 using light or heat.

8. A coating which is obtained by curing the curable composition according to claim 4 using light or heat.

9. A laminate comprising:
a base material; and
the coating according to claim 5 which is disposed on the base material.

10. A laminate comprising:
a base material; and
the coating according to claim 6 which is disposed on the base material.

11. A laminate comprising:
a base material; and
the coating according to claim 7 which is disposed on the base material.

12. A laminate comprising:
a base material; and
the coating according to claim 8 which is disposed on the base material.

* * * * *